(12) United States Patent
Brunel

(10) Patent No.: US 8,920,769 B2
(45) Date of Patent: Dec. 30, 2014

(54) AMINO CATALYZED PRODUCTION OF HYDROGEN FROM SILYLATED DERIVATIVES AS HYDROGEN CARRIER

(75) Inventor: Jean-Michel Brunel, Marseilles (FR)

(73) Assignees: Universite d'Aix-Marseille, Marseille Cedex (FR); Centre National de la Recherche Scientifique (C.N.R.S.), Paris (FR)

( * ) Notice: Subject to any disclaimer, the term of this patent is extended or adjusted under 35 U.S.C. 154(b) by 529 days.

(21) Appl. No.: 13/202,533

(22) PCT Filed: Feb. 19, 2010

(86) PCT No.: PCT/EP2010/052165
§ 371 (c)(1),
(2), (4) Date: Dec. 28, 2011

(87) PCT Pub. No.: WO2010/094785
PCT Pub. Date: Aug. 26, 2010

(65) Prior Publication Data
US 2012/0141365 A1    Jun. 7, 2012

Related U.S. Application Data

(60) Provisional application No. 61/154,105, filed on Feb. 20, 2009, provisional application No. 61/225,726, filed on Jul. 15, 2009.

(51) Int. Cl.
| | | |
|---|---|---|
| C01B 3/02 | (2006.01) | |
| C01B 3/22 | (2006.01) | |
| B01J 7/00 | (2006.01) | |
| C09K 3/00 | (2006.01) | |
| C08L 83/14 | (2006.01) | |
| C08L 83/04 | (2006.01) | |
| C01B 3/06 | (2006.01) | |
| C08G 77/50 | (2006.01) | |
| C08G 77/12 | (2006.01) | |

(52) U.S. Cl.
CPC ............. *C01B 3/065* (2013.01); *C08L 83/14* (2013.01); *C08L 83/04* (2013.01); *C08G 77/50* (2013.01); *Y02E 60/362* (2013.01); *C08G 77/12* (2013.01)
USPC ......... 423/648.1; 48/61; 252/182.3; 422/211

(58) Field of Classification Search
USPC .......... 423/648.1; 48/61; 252/182.3; 422/211
See application file for complete search history.

(56) References Cited

U.S. PATENT DOCUMENTS

| | | | |
|---|---|---|---|
| 7,879,310 B2 * | 2/2011 | Spear et al. ............... | 423/648.1 |
| 2007/0244324 A1 * | 10/2007 | Brady et al. ............... | 544/301 |
| 2008/0267859 A1 | 10/2008 | Abu-Omar ............... | 423/648.1 |
| 2012/0302811 A1 * | 11/2012 | Long et al. ............... | 585/660 |

FOREIGN PATENT DOCUMENTS

| | | |
|---|---|---|
| WO | WO2007/019172 | 2/2007 |
| WO | WO2008/094840 | 8/2008 |
| WO | WO2009/023535 | 2/2009 |

OTHER PUBLICATIONS

Written Opinion of the International Searching Authority issued on May 20, 2010 in connection with International Application No. PCT/EP2010/052165.
International Search Report issued on May 20, 2010 in connection with International Application No. PCT/EP2010/052165.

\* cited by examiner

*Primary Examiner* — Wayne Langel
(74) *Attorney, Agent, or Firm* — Davidson, Davidson & Kappel, LLC

(57) ABSTRACT

A method for producing hydrogen comprising the steps of: i) contacting a compound (C) comprising one or more groups Si—H with an amine based catalyst in a solvent selected from an alcohol or an aqueous solution, thereby forming hydrogen and a by-product (C1); wherein said amine based catalyst is as defined in claim 1; ii) recovering the obtained hydrogen.

33 Claims, No Drawings

AMINO CATALYZED PRODUCTION OF HYDROGEN FROM SILYLATED DERIVATIVES AS HYDROGEN CARRIER

This application claims benefit to U.S. provisional Applications Nos. 61/154,105 and 61/225,726 filed on Feb. 20, 2009 and Jul. 15, 2009 respectively, the disclosure of which is incorporated herein by reference in its entirety as if full set forth herein.

The invention relates to the production of hydrogen, notably from silylated derivatives as hydrogen carrier through an amino catalyzed reaction.

The patent application WO 2008/094840 discloses a method for producing hydrogen from hydrolysis of organosilane compounds in the presence of a sodium hydroxide solution and a catalyst consisting of a substoichiometric amount of an organic amine, notably the n-octylamine and n-propylamine. However, some of the used organosilane compounds such as siloxene are expensive and quite toxic. Furthermore, such compounds often lead to the formation of not environment-friendly by-products of which recycling has not been completely envisioned and appears quite difficult and expensive.

The patent application WO2007019172 discloses a method of generating hydrogen comprising contacting water and silane with an acid, amine or metal catalyst, wherein the silane is converted into hydrogen and a silicate. The amine may be notably an alkylamine, such as octylamine, butylamine or methylamine.

There remains a need for further improvements in efficiency, performance, and cost effectiveness of such clean energy sources, for a variety of applications, such as portable and stationary fuels cells or emissions control system for motor vehicles. There remains a need for improvements which exhibit enhanced efficiency, performance and that are cost effective.

It now has been discovered that by using an amine as a catalyst, preferably primary amine derivatives, in alcohol, hydrogen could be produced in large amounts, with high yields, in a very short time and with very low production costs. More particularly, hydrogen may be advantageously produced in one step from unexpensive commercially available products. Further, this method can be easily scaled up.

Thus, in one aspect, the invention is directed to a method for producing hydrogen comprising the steps of:
i) contacting a compound (C) comprising one or more groups Si—H with an amine based catalyst in solvent selected from an alcohol or an aqueous solution, notably water, thereby forming hydrogen and a by-product (C1);
wherein said amine based catalyst is selected from:
a compound of formula $R^a R^b R^c N$ wherein:
$R^a$, $R^b$, $R^c$ are each, independently selected from H, $C_1$-$C_6$ alkyl, $C_6$-$C_{10}$ aryl, aralkyl, 5 to 7 membered heteroaryl, 5 to 7 membered heterocyclyl;
wherein said alkyl or aryl groups are optionally substituted by one to three $R^d$;
$R^d$ is selected from Cl, Br, I, F, OH, $C_1$-$C_6$ alkyl, $C_1$-$C_6$ alkoxy, $C_6$-$C_{10}$ aryl, aralkyl, $NO_2$, $NH_2$, CN, COOH; or
a polymer-supported catalyst bearing one or more groups $NR^a R^b$, $R^a$ and $R^b$ being as defined hereabove; and
ii) recovering the obtained hydrogen.
Preferably, $R^a$ is H.
Preferably, $R^b$ is H.
In a preferred embodiment, $R^c$ is $C_1$-$C_6$ alkyl, or aralkyl.

Preferably, the amine based catalyst $R^a R^b R^c N$ is a secondary or primary amine, most preferably a primary amine.

In a preferred embodiment, $R^a R^b R^c N$ is a benzylamine optionally substituted by one to three $R^d$ represented by the following formula (B):

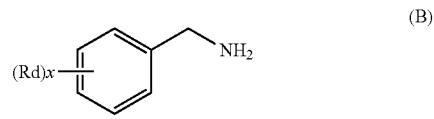

wherein x is 0, 1, 2 or 3 and $R^d$ is as defined above.
Preferably, $R^d$ is preferably selected from F or $CH_3$.

In another preferred embodiment, the amine based catalyst is a polymer-supported catalyst.

As used herein, the term "polymer-supported catalyst" refers to a catalyst system comprising a polymer support in which the catalytically active species, namely $NR^a R^b$, are immobilized through chemical covalent bonds (L). The polymer may be notably selected from polystyrene, polyethylene, polypropylene. As an example, the covalent bond (L) may be selected from $C_2$-$C_6$ alkylene, or phenylene groups.

Preferably, the polymer supported catalyst is the (aminomethyl)polystyrene which is commercially available.

Without willing to be bound to any particular theory, it is supposed that the free orbital of the catalyst nitrogen atom activates the Si—H bond which can then undergo a nucleophilic substitution by the solvent ($RO^-$ or $OH^-$). As a result, the amine based catalyst is advantageously not consumed during the reaction According to a preferred embodiment, the method for producing hydrogen ($H_2$) comprises the steps consisting in:
i) contacting a compound (C) comprising one or more groups Si—H with a benzylamine of formula (B) as a catalyst, in an aqueous solvent, thereby forming hydrogen and a by-product (C1);

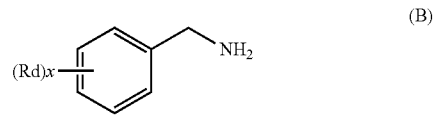

wherein:
$R_d$ is, at each occurrence, independently selected from Cl, Br, I, F, $C_1$-$C_6$ alkyl, $C_1$-$C_6$ alkoxy, $C_6$-$C_{10}$ aryl, aralkyl, OH, $NO_2$, $NH_2$, CN, COOH; and
x is 0, 1, 2 or 3;
ii) recovering the obtained hydrogen.

Preferably, the compound of formula (B) is an unsubstituted benzylamine (x=0).

Preferably, the aqueous solvent is an aqueous solution of a mineral base, notably of alkaline or alkaline-earth metal hydroxide.

Preferably, the aqueous solution is a potassium hydroxide or sodium hydroxide solution, most preferably a sodium hydroxide solution.

Preferably, the concentration of the hydroxide solution ranges from 20 to 40% in water (weight/weight)

According to another particular embodiment, the aqueous solution is a solution of a mineral acid, such as notably a hydrochloride acid aqueous solution. Preferably, the concentration of the mineral acid ranges from 1 to 5 $mol.L^{-1}$.

In a preferred embodiment, the molar ratio of the amine based catalyst relative to compound (C) ranges from 0.01 to 0.5 equivalents, more preferably from 0.01 to 0.1 equivalents, it being understood that when the amine based catalyst is a polymer-supported catalyst, this ratio refers to number of moles of amine functions $NR^aR^b$ which are present on the polymer.

Preferably, the solvent is an alcohol, more preferably methanol. Advantageously, the alcohol may be present in a stoechiometric amount relative to that of the compound (C).

Alternatively, the solvent may be water, optionally containing an alkaline or alkaline earth metal salt. According to this embodiment, the amine is preferably a benzylamine of formula (B):

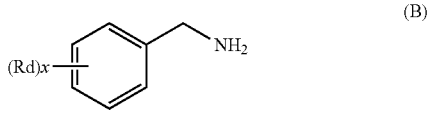

wherein x is 0, 1, 2 or 3 and $R^d$ is as defined above.

Preferably, the compound (C) comprises at least two groups Si—H.

Preferably, the compound (C) comprises one or more monomer units of formula (A):

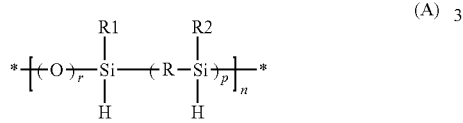

wherein:
R is a bond, $C_1$-$C_6$ alkylene, $(C_1$-$C_4$ alkylene$)_m$-Z—$(C_1$-$C_4$ alkylene$)_q$;
Z is O, $NR^{10}$, $S(O)_y$, $CR^{10}$=$CR^{10}$, C≡C, $C_6$-$C_{10}$ arylene, 5-10 membered heteroarylene, or $C_3$-$C_6$ cycloalkylene;
$R^1$, $R^2$ are each independently selected from H, halogen, $C_1$-$C_{10}$ alkyl, $C_3$-$C_{10}$ cycloalkyl, $C_6$-$C_{12}$ aryl, aralkyl, 5 to 10-membered heteroaryl, $OR^3$, $NR^4R^5$, $SiR^6R^7R^8$, wherein said aryl groups are optionally substituted by one to three $R^9$ groups;
$R^3$ is H, $C_1$-$C_6$ alkyl, $C_6$-$C_{10}$ aryl, aralkyl;
$R^4$, $R^5$ are each independently selected from H, $C_1$-$C_6$ alkyl, $C_6$-$C_{10}$ aryl, aralkyl;
$R^6$, $R^7$, $R^8$ are each independently selected from H, $OR^3$, $C_1$-$C_6$ alkyl, $C_6$-$C_{10}$ aryl, aralkyl;
$R^9$ is selected from halogen, $C_1$-$C_{10}$ alkyl, $OR^{10}$, $NO_2$, $NR^{11}R^{12}$, CN, C(=O)$R^{10}$, C(=O)$OR^{10}$, S(=O)$CH_3$, wherein said alkyl group is optionally substituted by one or more halogen;
$R^{10}$ is H or $C_1$-$C_3$ alkyl;
$R^{11}$, $R^{12}$ are each independently selected from H, or $C_1$-$C_{10}$ alkyl;
m, q are 0 or 1;
y is 0, 1 or 2;
n, p are intengers each representing the number of repeating units, with
n being superior or equal than 1, and
p being 0 or 1;
r is 0 or 1 provided that p+r is 0 or 1, it being understood that when the solvent is an alcohol, r is 0.
In a preferred embodiment, p is 0.
In a certain aspect, r is 1.

In a preferred aspect of the invention, there are included a method comprising reacting compounds (C) comprising one or more monomer unit of formula (Ia):

Preferably, the monomer unit is a compound of formula (Ia) wherein $R^1$ is H or $C_1$-$C_6$ alkyl and $R^2$ is H. More preferably, $R^1$ is methyl or H and $R^2$ is H.

Preferably, the compound (C) is polymethylhydrosiloxane (PMHS). This compound indeed offers many advantages. This by-product of the silicone industry is a cheap, easy to handle, and environmentally friendly reducing agent. Further, PMHS is more air and moisture stable than other silanes and can be stored for long periods of time without loss of activity. Finally, PHMS has revealed to be an hydrogen carrier with a high hydrogen storage density.

Preferably, the compound (C) comprises 2 to 1000 monomer units of formula (Ia), more preferably from 2 to 100. As an example, PHMS available from Sigma-Aldrich company (References 81330 and 176206) having an average molecular weight ranging from 240-3200 g $mol^{-1}$ (corresponding to 4-53 monomer units) may be used.

In an additional aspect of the present invention, r is 0.
In another preferred aspect, p is 0.
In a preferred aspect of the invention, the compound (C) comprises one or more monomer unit of formula (Ib):

Preferably, the compound comprising a monomer unit of formula (Ib) is phenylsilane (PhSiH$_3$), tetrasilylmethane (C(SiH$_3$)$_4$), or N,N-diethyl-1,1-dimethylsilylamine ((Et)$_2$N—SiH(CH$_3$)$_2$), phenylsilane and tetrasilylmethane being particularly preferred.

In a still further preferred embodiment, p is 1.
Preferably, r is 0.
Preferably, R is a bond or $C_1$-$C_6$ alkylene, notably —CH$_2$—CH$_2$—. Alternatively, R is Z, with Z being O or $NR^{10}$, notably NH.

Preferably, the monomer unit is of formula (Ic):

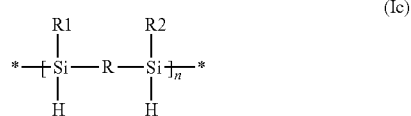

Preferably, the compound (C) comprising a monomer unit of formula (Ic) is tetramethyldisiloxane ((CH$_3$)$_2$HSi—O—SiH(CH$_3$)$_2$), 1,1,3,3-tetramethyldisilazane ((CH$_3$)$_2$HSi—NH—SiH(CH$_3$)$_2$), 1,4-disilabutane (H$_3$Si(CH$_2$)$_2$SiH$_3$), or tetramethyl-disilane ((CH$_3$)$_2$HSi—SiH(CH$_3$)$_2$), 1,4-disilabutane being particularly preferred.

Phenylsilane, tetrasilylmethane, and disilabutane are advantageously commercially available, easy to handle, stable to air and moisture, and can be stored for long periods of time without loss of activity. Finally, phenylsilane, tetrasilylmethane, and 1,4-disilabutane have all revealed to be hydrogen carriers with a high hydrogen storage density.

The temperature of the reaction in step i) of the method according to the invention may vary in a wide range, and may range notably vary from 0 to 200° C. More preferably, the temperature ranges from 15 to 30° C. and is most preferably of about 20° C.

The hydrogen obtained by the method of the invention is recovered, either for storage or for use to produce energy.

In a particular embodiment, the method of the invention further comprises a step iii) of recycling the obtained by-product (C1).

When water is used as a solvent, the method of the invention may further comprises two subsequent steps, after step i):
iii) contacting the by-product (C1) with an acyl halide;
iv) contacting the obtained product with a metal hydride, thereby regenerating compound (C).

The acyl halide may be notably $CH_3C(=O)Cl$. The metal hydride may be notably an aluminum hydride such as $LiAlH_4$.

As an example, recycling the silylated derivative may be performed according to the following scheme:

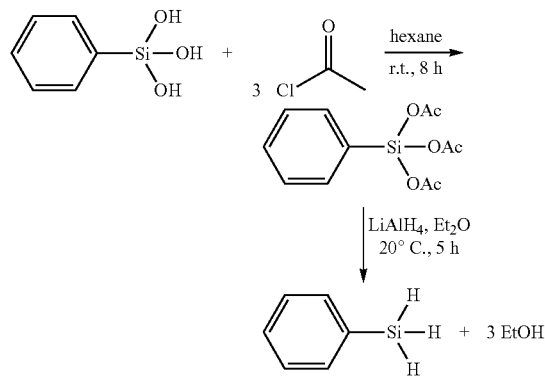

More generally, the invention relates to a method comprising:
i) producing hydrogen from a compound (C); and
ii) recycling the obtained by-product (C1) of step i).

Particularly preferred compositions are those comprising phenylsilane, 1,4-disilabutane, or tetrasilylmethane in methanol and in combination with a catalytic amount of amine.

In particular, the compositions, or compound (C) in methanol and in the presence of a catalytic amount of amine may be used as a fuel, a propellant or a precursor thereof. As an example, they may be used as a fuel in a fuel cell, in an engine as a NOx reducing agent or as a supplementary fuel or for any other consuming device. As another example, they may be used in a battery.

As a further aspect, the invention also relates to the use of a composition according to the invention for producing hydrogen.

In an additional aspect, the invention relates to a device for producing hydrogen according to the method hereabove described, said device comprising a reaction chamber comprising:
a compound (C)/solvent mixture inlet;
an hydrogen outlet;
a by-product collector; and
an inner surface intended to be in contact with the compound (C)/solvent mixture, said inner surface being coated with a polymer supported catalyst as defined above.

Preferably, the device of the invention further comprises a mixing chamber for mixing the compound (C) with the solvent, wherein the mixing chamber is connected to the reaction chamber.

Preferably, the device of the invention further comprises a by-product collection chamber, wherein the collection chamber is connected to the reaction chamber.

In a preferred embodiment, the device further comprises a second chamber comprising:
an outer envelope;
an internal wall separating said chamber into two distinct compartments, namely into:
a first compartment containing the compound (C)/solvent mixture to be introduced in the reaction chamber; and
a second compartment containing the by-product (C1) collected from the reaction chamber;
the first and second compartment being each connected to the reaction chamber; and
means for moving the internal wall relative to the outer envelope, so as to make the respective volumes of each compartment to vary.

In a still further aspect, the invention relates to a method for producing hydrogen ($H_2$) comprising the steps consisting in:
a) reacting a compound (C) comprising one or more groups Si—H, with a fluoride ions source, thereby forming hydrogen and a by-product (C1); and
b) recovering the obtained hydrogen.

Such method has been disclosed in U.S. patent application No. 61/122785, which content is incorporated herein by reference.

In a preferred embodiment, the compound (C) comprises one or more monomer units of formula (A), notably of formula (Ib), said formulae (A) and (Ib) being as defined hereabove. More preferably the compound (C) is tetrasilylmethane.

In that context, the solvent is preferably methanol.

Preferably, the fluoride ion source is preferably $Bu_4NF$.

Definitions

The following terms and expressions contained herein are defined as follows:

As used herein, the term "about" refers to a range of values from ±10% of a specified value.

As used herein, the term "alkyl" refers to a straight-chain, or branched alkyl group having 1 to 10 carbon atoms, such as methyl, ethyl, propyl, isopropyl, butyl, isobutyl, sec-butyl, tert-butyl, pentyl, isoamyl, neopentyl, 1-ethylpropyl, 3-methylpentyl, 2,2-dimethylbutyl, 2,3-dimethylbutyl, hexyl, octyl.

As used herein, the term "alkoxy" refers to a group alkyl-O—, said alkyl group being as defined herein. Examples of alkoxy groups include notably methoxy, or ethoxy.

As used herein, the term "cycloalkyl" refers to a saturated or partially saturated mono- or bicyclic alkyl ring system containing 3 to 10 carbon atoms. Preferred cycloalkyl groups include those containing 5 or 6 ring carbon atoms. Examples of cycloalkyl groups include such groups as cyclopropyl, cyclobutyl, cyclopentyl, cyclohexl, cycloheptyl, cyclooctyl, pinenyl, and adamantanyl.

As used herein, the term "aryl" refers to a substituted or unsubstituted, mono- or bicyclic hydrocarbon aromatic ring system having 6 to 12 ring carbon atoms. Examples include phenyl and naphthyl. Preferred aryl groups include unsubstituted or substituted phenyl and naphthyl groups. Included within the definition of "aryl" are fused ring systems, including, for example, ring systems in which an aromatic ring is fused to a cycloalkyl ring. Examples of such fused ring systems include, for example, indane, indene, and tetrahydronaphthalene.

As used herein, the term "arylalkyl" or "aralkyl" refers to an alkyl group that is substituted with an aryl group, wherein the alkyl and aryl groups are as defined above. Examples of arylalkyl groups include, but are not limited to, benzyl, bromobenzyl, phenethyl, benzhydryl, diphenylmethyl, triphenylmethyl, diphenylethyl, and naphthylmethyl.

As used herein, the term "heteroaryl" refers to an aromatic group containing 5 to 10 ring carbon atoms in which one or more ring carbon atoms are replaced by at least one hetero atom such as —O—, —N—, or —S—. Examples of heteroaryl groups include pyrrolyl, furanyl, thienyl, pyrazolyl, imidazolyl, thiazolyl, isothiazolyl, isoxazolyl, oxazolyl, oxathiolyl, oxadiazolyl, triazolyl, oxatriazolyl, furazanyl, tetrazolyl, pyridyl, pyrazinyl, pyrimidinyl, pyridazinyl, triazinyl, indolyl, isoindolyl, indazolyl, benzofuranyl, isobenzofuranyl, purinyl, quinazolinyl, quinolyl, isoquinolyl, benzoimidazolyl, benzothiazolyl, benzothiophenyl, thianaphthenyl, benzoxazolyl, benzisoxazolyl, cinnolinyl, phthalazinyl, naphthyridinyl, and quinoxalinyl. Included within the definition of "heteroaryl" are fused ring systems, including, for example, ring systems in which an aromatic ring is fused to a heterocycloalkyl ring. Examples of such fused ring systems include, for example, phthalamide, phthalic anhydride, indoline, isoindoline, tetrahydroisoquinoline, chroman, isochroman, chromene, and isochromene.

As used herein, the term "heterocyclyl" refers to a substituted or unsubstituted carbocyclic group in which the ring portion includes at least one heteroatom such as O, N, or S. The nitrogen and sulfur heteroatoms may be optionally oxidized, and the nitrogen may be optionally substituted in non-aromatic rings. Exemplary monocyclic heterocyclyl rings include piperidyl, pyrrolidinyl, piperazinyl, morpholinyl, thiomorpholinyl, thiazolidinyl, 1,3-dioxolanyl, 1,4-dioxanyl, tetrahydrofuranyl, tetrahydrothiophenyl, tetrahydrothiopyranyl, and the like.

As used herein, the expression "as needed basis" refers to the ability to control the reactions conditions wherein the amount of hydrogen is controlled.

EXPERIMENTAL SECTION

All solvents were purified according to reported procedures, and reagents like amine based catalysts, PHMS, phenylsilane or 1,4-disilabutane were used as commercially available.

In particular, PHMS was purchased from Sigma-Aldrich company (References 81330 and 176206). It has an average molecular weight ranging from 240-3200 g mol$^{-1}$ (corresponding to 4-53 monomer units).

Phenylsilane or 1,4-disilabutane were purchased from Sigma-Aldrich company and ABCR company.

Example 1

Production of Hydrogen Using Phenylsilane Ia in the Presence of a Catalytic Amount of Benzylamine

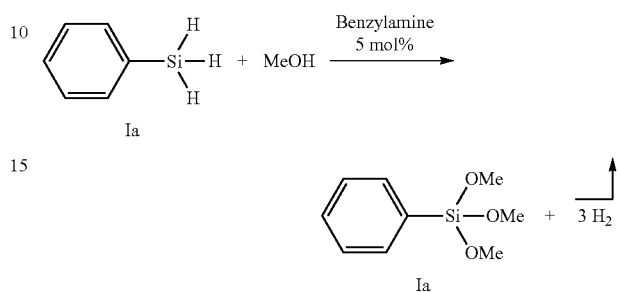

In a two-necked round flask connected to an isobaric equipment consisting of a graduated tube connected to a separator funnel filled with a copper sulfate solution was placed at 20° C. under air 17 mg (1.6 10$^{-4}$ mole) of benzylamine (5 mol %). 359 mg (400 μL) of phenylsilane Ia (3.3 10$^{-3}$ mole) dissolved in 316 μL of methanol (9.9 10$^{-3}$ mole) was subsequently slowly introduced Immediately, an exothermic reaction occurred with an hydrogen gas evolution representing a total volume of 260 mL (98% yield) in less than 30 seconds. The siloxane derivative by-product IIa was obtained as a clear oil in a quantitative yield.

Example 2

General Production of Hydrogen under Various Experimental Conditions Using Phenylsilane Ia (According to Example 1 Experimental Conditions)

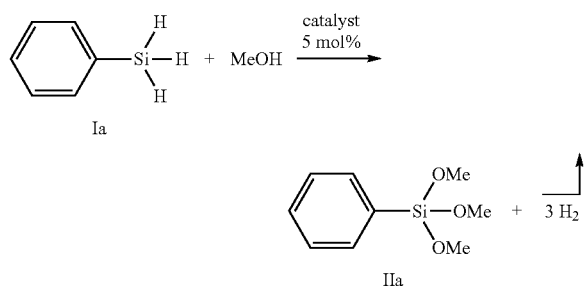

In a two-necked round flask connected to an isobaric equipment consisting of a graduated tube connected to a separator funnel filled with a copper sulfate solution was placed at 20° C. under air 3.2 10$^{-4}$ mole of amine catalyst (10 mol %). 359 mg (400 μL) of phenylsilane Ia (3.3 10$^{-3}$ mole) dissolved in 316 μL of methanol (9.9 10$^{-3}$ mole) was subsequently slowly introduced. Immediately, an exothermic reaction occurred with an hydrogen gas evolution.

| Entry | Catalyst | Volume H$_2$ (mL) (Yield %) | Time (sec.) |
|---|---|---|---|
| 1 | Benzylamine (5 mol %) | 260 (98%) | 30 |
| 2 | Benzylamine (10 mol %) | 260 (98%) | 5 |
| 3 | 4-Fluorobenzylamine (10 mol %) | 260 (98%) | 5 |
| 4 | 4-MethylBenzylamine (10 mol %) | 250 (94%) | 5 |
| 5 | Isopropylamine (10 mol %) | 260 (98%) | 5 |
| 6 | Isopropylamine (2 mol %) | 260 (98%) | 40 |
| 7 | Diisopropylamine (10 mol %) | 260 (98%) | 180 |
| 8 | Amino propyl morpholine (10 mol %) | 260 (98%) | 5 |
| 9 | 1,3-diamino propane (10 mol %) | 260 (98%) | 5 |
| 10 | N-methyl morpholine (10 mol %) | 130 (49%) | 360 |
| 11 | Aniline (10 mol %) | 50 (18%) | 300 |
| 12 | Dimethylamino pyridine (10 mol %) | 50 (18%) | 300 |
| 13 | Triethylamine (10 mol %) | 260 (98%) | 60 |
| 14 | 3-Aminopropanol (10 mol %) | 260 (98%) | 5 |

Example 3

Production of Hydrogen Using 1,4-disilabutane Ib in the Presence of a Catalytic Amount of Benzylamine

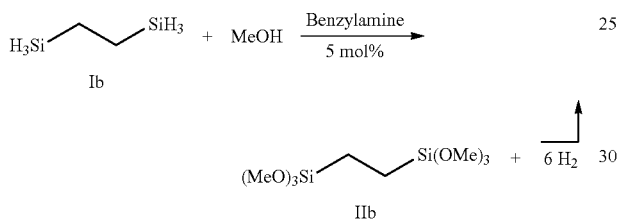

In a two-necked round flask connected to an isobaric equipment consisting of a graduated tube connected to a separator funnel filled with a copper sulfate solution was placed at 20° C. under air 11 mg (9 10$^{-5}$ mole) of benzylamine (5 mol %). 175 mg (250 μL) of 1,4-disilabutane Ib (1.94 10$^{-3}$ mole) dissolved in 373 μL of MeOH (1.16 10$^{-2}$ mole) was subsequently added with a syringe. Immediately, an exothermic reaction occurred with an hydrogen gas evolution representing a total volume of 265 mL (95%) in less than 30 seconds. The siloxane derivative by-product IIIb was obtained as a clear oil in a quantitative yield.

Example 4

Production of Hydrogen Using Phenylsilane Ia in the Presence of a Catalytic Amount of Polystyrene Grafted Benzylamine Catalyst

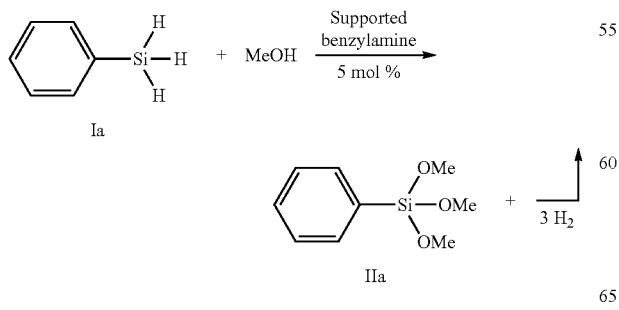

In a two-necked round flask connected to an isobaric equipment consisting of a graduated tube connected to a separator funnel filled with a copper sulfate solution was placed at 20° C. under air 250 mg (0.4-1.2 10$^{-3}$ mole) of polymeric benzylamine catalyst (Polystyrene AM-NH$_2$ Ref 81553-10G, Aldrich)(5 mol %). 250 mg (290 μL) of phenylsilane Ia (2.3 10$^{-3}$ mole) dissolved in 221 μL of methanol (6.9 10$^{-3}$ mole) was subsequently slowly introduced Immediately, an exothermic reaction occurred with an hydrogen gas evolution representing a total volume of 165 mL (100% yield) in less than 30 seconds. The siloxane derivative by-product IIa was obtained as a clear oil in a quantitative yield.

Example 5

Production of Hydrogen Using Phenylsilane Ia in the Presence of a Catalytic Amount of Recycled Polystyrene Grafted Benzylamine Catalyst

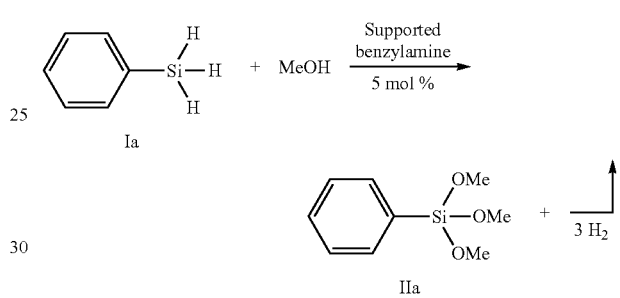

The catalyst used in example 4 was filtered, washed with methanol and dried before to be reused. In a two-necked round flask connected to an isobaric equipment consisting of a graduated tube connected to a separator funnel filled with a copper sulfate solution was placed at 20° C. under air 250 mg (0.4-1.2 10$^{-3}$ mole) of recycled polymeric benzylamine catalyst (Polystyrene AM-NH2 Ref 81553-10G, Aldrich) (5 mol %). 250 mg (290 μL) of phenylsilane Ia (2.3 10$^{-3}$ mole) dissolved in 221 μL of methanol (6.9 10$^{-3}$ mole) was subsequently slowly introduced Immediately, an exothermic reaction occurred with an hydrogen gas evolution representing a total volume of 160 mL (97% yield) in less than 30 seconds. The siloxane derivative by-product IIa was obtained as a clear oil in a quantitative yield.

Example 6

Production of Hydrogen Using Tetrasilylmethane in the Presence of a Catalytic Amount of Benzylamine The conditions of example 3 were applied to the production of hydrogen from tetrasilylmethane in the presence of benzylamine:

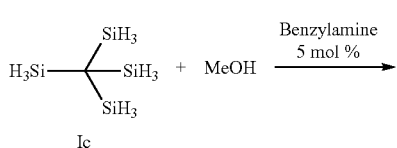

-continued

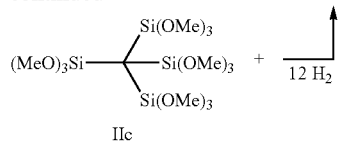

IIc

Hydrogen was recovered with 98% yield in 20 seconds.

Example 7

Production of Hydrogen Using Tetrasilylmethane Ic in the Presence of Methanol and of a Catalytic Amount of Tetrabutylammonium Fluoride

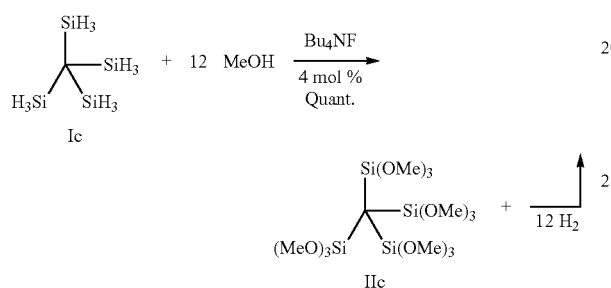

In a two-necked round flask connected to an isobaric equipment consisting of a graduated tube connected to a separator funnel filled with a copper sulfate solution was placed at 20° C. under air 263 mg of tetrasilylmethane Ic (1.94 $10^{-3}$ mole). A solution of 20 mg (7.7 $10^{-5}$ mole) of tetrabutylammonium fluoride in anhydrous methanol (744 µL, 2.32 $10^{-2}$ mole) was added with a syringe. Immediately, an exothermic reaction occurred with an hydrogen gas evolution representing a total volume of 555 mL in less than 10 seconds. The siloxane derivative by-product IIc was obtained as a clear oil in a quantitative yield.

Hydrogen was recovered with more than 98% yield.

Example 8

Production of Hydrogen Using Phenylsilane in the Presence of Water and a Catalytic Amount of Benzylamine

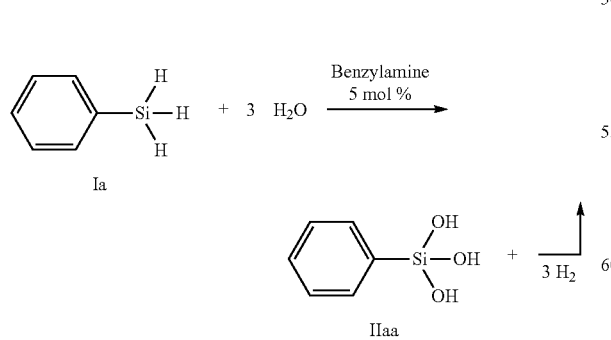

In a two-necked round flask connected to an isobaric equipment consisting of a graduated tube connected to a separator funnel filled with a copper sulfate solution was placed at 20° C. under air 359 mg (400 µL) of phenylsilane Ia (3.3 $10^{-3}$ mole). 17 mg (1.6 $10^{-4}$ mole) of benzylamine (5 mol %) was introduced, then 1 mL of water was subsequently added with a syringe. Immediately, an exothermic reaction occurred with an hydrogen gas evolution representing a total volume of 230 mL (90% yield) in less than 15 seconds. The siloxane derivative by-product IIaa was obtained as a clear oil in a quantitative yield.

Example 9

Production of Hydrogen Using Phenylsilane in the Presence of Potassium Hydroxide (30%) and a Catalytic Amount of Benzylamine

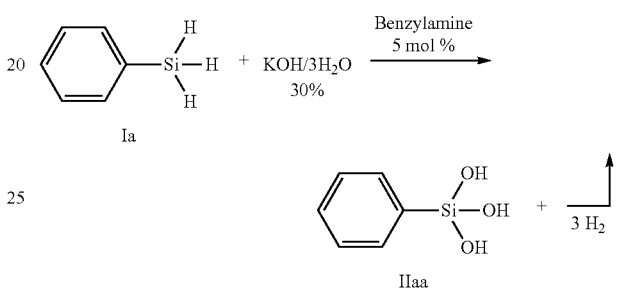

In a two-necked round flask connected to an isobaric equipment consisting of a graduated tube connected to a separator funnel filled with a copper sulfate solution was placed at 20° C. under air 359 mg (400 µL) of phenylsilane Ia (3.3 $10^{-3}$ mole). 17 mg (1.6 $10^{-4}$ mole) of benzylamine (5 mol %) was introduced, then 1 mL of potassium hydroxide (30%) solution was subsequently added with a syringe. Immediately, an exothermic reaction occurred with an hydrogen gas evolution representing a total volume of 240 mL (92% yield) in less than 15 seconds. The siloxane derivative by-product IIaa was obtained as a clear oil in a quantitative yield.

Example 10

Production of Hydrogen Using Phenylsilane in the Presence of Sodium Hydroxide (1M) and a Catalytic Amount of Tetrabutylammonium Fluoride

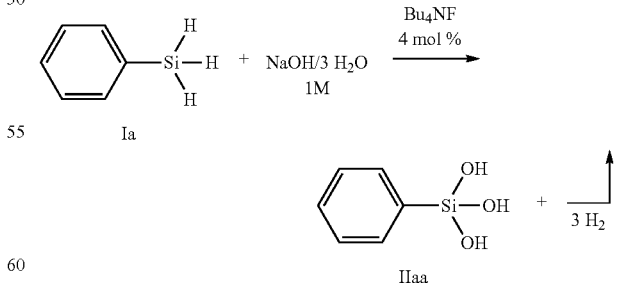

In a two-necked round flask connected to an isobaric equipment consisting of a graduated tube connected to a separator funnel filled with a copper sulfate solution was placed at 20° C. under air 175 mg (200 µL) of phenylsilane Ia (1.65 $10^{-3}$ mole). Tetrabutylammonium fluoride (4 mol %) was introduced, then 200 μL of sodium hydroxide (1M) solution was subsequently added with a syringe. Immediately, an exothermic reaction occurred with an hydrogen gas evolution (52% yield) in less than 15 seconds. The siloxane derivative by-product IIaa was obtained as a clear oil in a quantitative yield.

Example 11

Recycling the Silanol Derivative (IIaa)

The recycling of the silanol derivative (IIaa) was performed by applying and adapting the procedures disclosed in the references [1] and [2] to the recycling of silanol (IIc) obtained in examples 8 to 10, according to the following scheme:

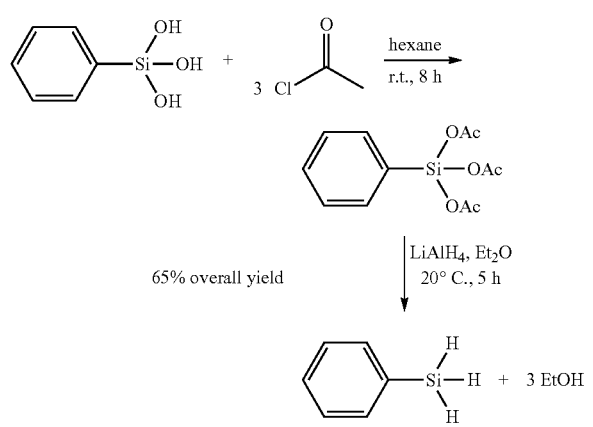

Example 12

Production of Hydrogen Using PHMS

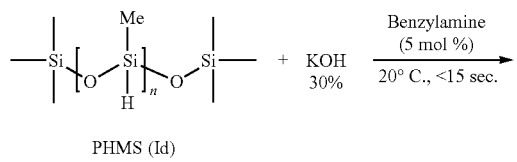

PHMS (Id)

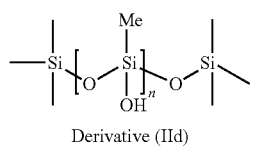

Derivative (IId)

In a two necked round flask connected to an isobaric equipment consisting of a graduated tube connected to a separator funnel filled with a copper sulfate solution was placed at 20° C. under air 1 mL of PHMS (Id) (around $1.6 \cdot 10^{-2}$ mole silane unit). 90 mg ($8.3 \cdot 10^{-4}$ mole) of benzylamine (5 mol % with respect to the siloxane unit) was introduced, then 1 mL of potassium hydroxide (30%) solution was subsequently added with a siringue. Immediately, an exothermic reaction occurred with an hydrogen gas evolution representing a total volume of 280 mL (95% yield) in less than 20 seconds. The siloxane derivative by-product (IId) was obtained as a white solid.

Example 13

General Production of Hydrogen under Various Experimental Conditions Using PHMS

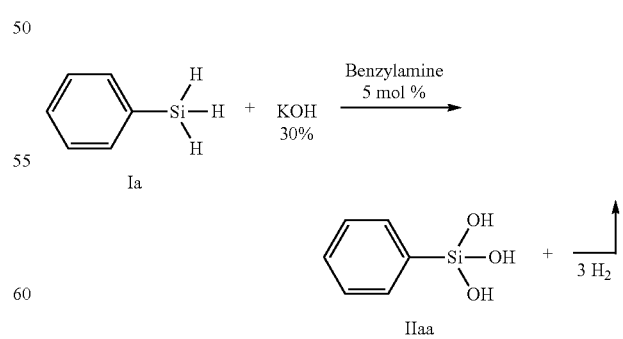

| Entry | PHMS | Amine | Solvent | Volume $H_2$ (mL) (Yield %) | Time (sec.) |
|---|---|---|---|---|---|
| 1 | 1 mL | Benzylamine (90 mg) (5 mol %) | KOH (30%) 1 mL | 280 (95%) | 15 |
| 2 | 1 mL | Benzylamine (180 mg) (10 mol %) | KOH (30%) 1 mL | 280 (95%) | 15 |
| 3 | 1 mL | Benzylamine (45 mg) (1 mol %) | KOH (30%) 1 mL | 270 (92%) | 120 |
| 4 | 1 mL | Benzylamine (90 mg) (5 mol %) | KOH (30%) 0.5 mL | 250 (85%) | 60 |
| 5 | 1 mL | Benzylamine (90 mg) (5 mol %) | — | — | — |
| 6 | 1 mL | NEt$_3$ (84 mg) (5 mol %) | KOH (30%) 1 mL | 130 (44%) | 300 |
| 7 | 1 mL | Aniline (77 mg) (5 mol %) | KOH (30%) 1 mL | 25 (8.5%) | 420 |
| 8 | 1 mL | Ethylenediamine (49 mg) (10 mol %) | KOH (30%) 1 mL | 150 (51%) | 300 |

Example 14

Production of Hydrogen Using Phenylsilane Ib in the Presence of Potassium Hydroxide (30%) and a Catalytic Amount of Benzylamine In a two-necked round flask connected to an isobaric equipment consisting of a graduated tube connected to a separator funnel filled with a copper sulfate solution was placed at 20° C. under air 359 mg (400 μL) of phenylsilane la (3.3 $10^{-3}$ mole). 17 mg (1.6 10⁻⁴ mole) of benzylamine (5 mol %) was introduced, then 1 mL of potassium hydroxide (30%) solution was subsequently added with a siringue. Immediately, an exothermic reaction occured with an hydrogen gas evolution representing a total volume of 240 mL (92% yield) in less than 15 seconds. The siloxane derivative by-product IIaa was obtained as a clear oil in a quantitative yield.

Example 15

Production of Hydrogen Using 1,4-disilabutane Ib in the Presence of Potassium Hydroxide (30%) and a Catalytic Amount of Benzylamine

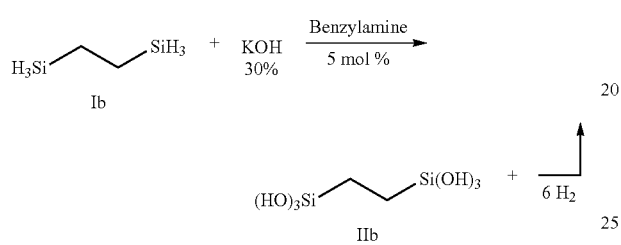

In a two-necked round flask connected to an isobaric equipment consisting of a graduated tube connected to a separator funnel filled with a copper sulfate solution was placed at 20° C. under air 175 mg (250 µL) of 1,4-disilabutane Ib (1.94 10⁻³ mole). 11 mg (9 10⁻⁵ mole) of benzylamine (5 mol %) was introduced, then 1 mL of potassium hydroxide (30%) solution was subsequently added with a siringue. Immediately, an exothermic reaction occured with an hydrogen gas evolution representing a total volume of 170 mL (44%) in less than 10 seconds. The siloxane derivative by-product IIb was obtained as a clear oil in a quantitative yield.

Example 16

Production of Hydrogen Using Tetramethyldisiloxane Id in the Presence of Potassium Hydroxide (30%) and a Catalytic Amount of Benzylamine

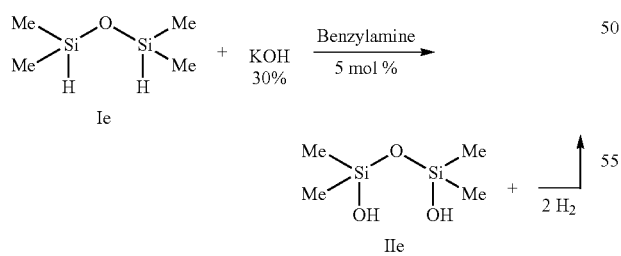

In a two-necked round flask connected to an isobaric equipment consisting of a graduated tube connected to a separator funnel filled with a copper sulfate solution was placed at 20° C. under air 877 mg (1.15 mL) of tetramethyldisiloxane Ie (4.46 10⁻³ mole). 23 mg (2.2 10⁻⁴ mole) of benzylamine (5 mol %) was introduced, then 1 mL of potassium hydroxide (30%) solution was subsequently added with a siringue. Immediately, an exothermic reaction occured with an hydrogen gas evolution representing a total volume of 200 mL (93%) in around 5 minutes.

Example 17

Production of Hydrogen Using N,N-diethyl-1,1-dimethylsilylamine If in the Presence of Potassium Hydroxide (30%) and a Catalytic Amount of Benzylamine In a two-necked round flask connected to an isobaric equipment consisting of a graduated tube connected to a separator funnel filled with a copper sulfate solution was placed at 20° C. under air 195 mg (250 µL) of N,N-diethyl-1,1-dimethylsilylamine If (1.48 10⁻³ mole). 9 mg (7 10⁻⁵ mole) of benzylamine (5 mol %) was introduced, then 1 mL of potassium hydroxide (30%) solution was subsequently added with a syringe. Immediately, an exothermic reaction occured with an hydrogen gas evolution representing a total volume of 35 mL (>98%) in less than 10 seconds.

Example 18

Production of Hydrogen Using Phenylsilane Ib in the Presence of HCl (10%) and a Catalytic Amount of Benzylamine In a two-necked round flask connected to an isobaric equipment consisting of a graduated tube connected to a separator funnel filled with a copper sulfate solution was placed at 20° C. under air 359 mg (400 µL) of phenylsilane la (3.3 10⁻³ mole). 17 mg (1.6 10⁻⁴ mole) of benzylamine (5 mol %) was introduced, then 1 mL of hydrochloride acid (10%) solution was subsequently added with a siringue. Immediately, an exothermic reaction occured with an hydrogen gas evolution representing a total volume of 240 mL (92% yield) in less

Example 19

Production of Hydrogen Using Phenylsilane Ib in the Presence of Water and a Catalytic Amount of Benzylamine

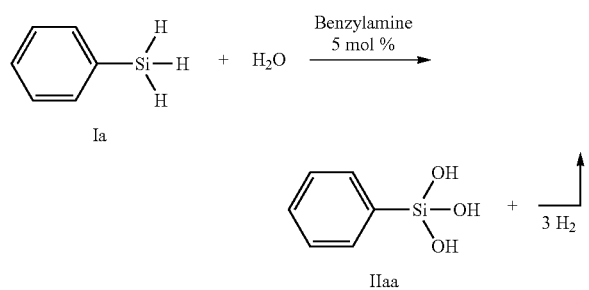

In a two-necked round flask connected to an isobaric equipment consisting of a graduated tube connected to a separator funnel filled with a copper sulfate solution was placed at 20° C. under air 359 mg (400 μL) of phenylsilane Ia (3.3 $10^{-3}$ mole). 17 mg (1.6 $10^{-4}$ mole) of benzylamine (5 mol %) was introduced, then 1 mL of water was subsequently added with a syringe. Immediately, an exothermic reaction occurred with an hydrogen gas evolution representing a total volume of 230 mL (90% yield) in less than 15 seconds. The siloxane derivative by-product IIaa was obtained as a clear oil in a quantitative yield.

REFERENCES

[1] Khimia i technolelementoorgan. I Polimenov (7), 55-57, 1978.
[2] Zeitschrift für Anorganische und Allgemeeine Chemie 552, 195-200, 1987.

The invention claimed is:

1. A method for producing hydrogen comprising the steps of:
   i) contacting a compound (C) comprising one or more groups Si—H with an amine based catalyst in a solvent selected from an alcohol or an aqueous solution, thereby forming hydrogen and a by-product (C1);
   wherein said amine based catalyst is selected from:
   (a)—a compound of formula $R^aR^bR^cN$ wherein:
      $R^a$ and $R^b$ are each, independently selected from the group consisting of H, $C_1$-$C_6$ alkyl, $C_6$-$C_{10}$ aryl, aralkyl, 5 to 7 membered heteroaryl, and 5 to 7 membered heterocyclyl;
      wherein said alkyl or aryl groups are optionally substituted by one to three $R^d$;
      $R^d$ is selected from the group consisting of Cl, Br, I, F, OH, $C_1$-$C_6$ alkyl, $C_1$-$C_6$ alkoxy, $C_6$-$C_{10}$ aryl, aralkyl, $NO_2$, $NH_2$, CN, COOH;
      $R^c$ is aralkyl; or
   (b)—a polymer-supported catalyst bearing one or more groups selected from the group consisiting of $NR^aR^b$, and $R^aR^b$ wherein:
      $R^a$ and $R^b$ are each, independently selected from the group consisting of H, $C_1$-$C_6$ alkyl, $C_6$-$C_{10}$ aryl, aralkyl, 5 to 7 membered heteroaryl and 5 to 7 membered heterocyclyl;
      wherein said alkyl or aryl groups are optionally substituted by one or three $R^d$;
      $R^d$ is selected from the group consisting of Cl, Br, I, F, OH, $C_1$-$C_6$ alkyl, $C_1$-$C_6$alkoxy, $C_6$-$C_{10}$ aryl,aralkyl, $NO_2$, $NH_2$, CN and COOH;
   ii) recovering the obtained hydrogen.
2. The method of claim 1, wherein $R^a$ is H.
3. The method of claim 2, wherein $R^b$ is H.
4. The method of claim 1, wherein the amine based catalyst is a benzylamine optionally substituted by one to three $R^d$.
5. The method of claim 1, wherein the amine based catalyst is benzylamine.
6. The method of claim 1, wherein the polymer supported catalyst is (Aminomethyl)polystyrene.
7. The method of claim 1, wherein the molar ratio of the amine based catalyst relative to compound (C) ranges from 0.01 to 0.1 equivalents.
8. The method of claim 1, wherein the alcohol is methanol.
9. The method of claim 1, wherein the aqueous solution is a solution of alkaline or alkaline-earth metal hydroxide.
10. The method of claim 9, wherein the aqueous solution is a potassium hydroxide solution.
11. The method of claim 1, wherein the aqueous solution is a solution of mineral acid.
12. The method of claim 11, wherein the mineral acid is HCl.
13. The method of claim 1, wherein the aqueous solution is water.
14. The method of claim 1, wherein the compound (C) comprises one or more monomer units of formula (A):

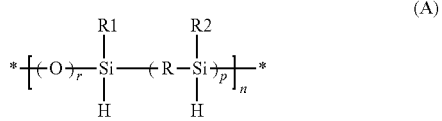

wherein:
   R is selected from the group consisting of a bond, $C_1$-$C_6$ alkylene and $(C_1$-$C_4$ alkylene$)_m$-Z—$(C_1$-$C_4$ alkylene$)_q$;
   Z is selected from the group consisting of O, $NR^{10}$, $S(O)_y$, $CR^{10}$=$CR^{10}$, C≡C, $C_6$-$C_{10}$ arylene, 5-10 membered heteroarylene and $C_3$-$C_6$ cycloalkylene;
   $R^1$, $R^2$ are each independently selected from the group consisting of H, halogen, $C_1$-$C_{10}$ alkyl, $C_3$-$C_{10}$ cycloalkyl, $C_6$-$C_{12}$ aryl, aralkyl, 5 to 10-membered heteroaryl, $OR^3$ and $NR^4R^5$, $SiR^6R^7R^8$, wherein said aryl groups are optionally substituted by one to three $R^9$ groups;
   $R^3$ is selected from the group consisting of H, $C_1$-$C_6$ alkyl, $C_6$-$C_{10}$ aryl and aralkyl;
   $R^4$, $R^5$ are each independently selected from the group consisting of H, $C_1$-$C_6$ alkyl, $C_6$-$C_{10}$ aryl and aralkyl;
   $R^6$, $R^7$, $R^8$ are each independently selected from the group consisting of H, $OR^3$, $C_1$-$C_6$ alkyl, $C_6$-$C_{10}$ aryl and aralkyl;
   $R^9$ is selected from the group consisting of halogen, $C_1$-$C_{10}$ alkyl, $OR^{10}$, $NO_2$, $NR^{11}R^{12}$, CN, C(=O)$R^{10}$, C(=O)$OR^{10}$ and S(=O)$CH_3$, wherein said alkyl group is optionally substituted by one or more halogen;
   $R^{10}$ is H or $C_1$-$C_3$ alkyl;
   $R^{11}$, $R^{12}$ are each independently selected from the group consisting of H and $C_1$-$C_{10}$ alkyl;
   m, q are 0 or 1;
   y is 0, 1 or 2;

n, p are intengers each representing the number of repeating units, with
n being superior or equal than 1, and
p being 0 or 1;
r is 0 or 1 provided that p+r is 0 or 1, it being understood that when the solvent is an alcohol r is 0.

15. The method of claim 14, wherein p is 0.
16. The method of claim 15, wherein r is 1.
17. The method of claim 16, wherein the monomer unit is of formula (Ia):

18. The method of claim 17, wherein the compound (C) is polymethylhydrosiloxane (PHMS).
19. The method of claim 15, wherein r is 0.
20. The method of claim 19, wherein the monomer unit is of formula (Ib):

21. The method of claim 1, wherein the compound (C) is $PhSiH_3$.
22. The method of claim 20, wherein the compound (C) comprising a monomer unit of formula (Ib) is $C(SiH_3)_4$.
23. The method of claim 14, wherein p is 1 and r is 0.
24. The method of claim 23, wherein the monomer unit is of formula (Ic):

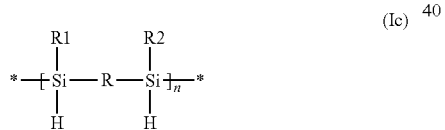

wherein R is $C_1$-$C_6$ alkylene.

25. The method of claim 24, wherein the compound (C) comprising a monomer unit of formula (Ic) is $H_3Si(CH_2)_2SiH_3$.
26. The method of claim 20, wherein the solvent is an aqueous solution and the amine based catalyst is a benzylamine of formula (B):

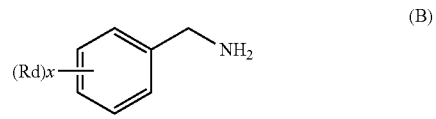

wherein x is 0, 1, 2 or 3 and $R^d$ is as defined in claim 1.

27. The method of claim 26, further comprising the following subsequent recycling steps:
iii) contacting the by-product (C1) with an acyl halide;
iv) contacting the obtained product with a metal hydride, thereby regenerating compound (C).

28. A composition comprising a compound (C), as defined in claim 1, the amine based catalyst as defined in claim 1 and the solvent as defined in claim 1.

29. A use of a composition of claim 28 for producing hydrogen comprising the step of contacting the compound (C), the amine based catalyst and the solvent.

30. A device for producing hydrogen according to claim 1, said device comprising a reaction chamber comprising:
a compound (C)/solvent mixture inlet;
an hydrogen outlet;
a by-product collector; and
a surface intended to be in contact with the compound (C)/solvent mixture, as defined in claim 1, coated with a polymer supported catalyst as defined in claim 1.

31. The device of claim 30, further comprising a mixing chamber for mixing the compound (C) with the solvent, wherein the mixing chamber is connected to the reaction chamber.

32. The device of claim 30, further comprising a by-product collection chamber, wherein the collection chamber is connected to the reaction chamber.

33. The device of claim 30, further comprising a second chamber comprising:
an outer envelope;
an internal wall separating said chamber into two distinct compartments, namely:
a first compartment containing the compound (C)/solvent mixture to be introduced in the reaction chamber; and
a second compartment containing the by-product (C1) collected from the reaction chamber;
the first and second compartment being each connected to the reaction chamber; and
means for moving the internal wall relative to the outer envelope, so as to make the respective volumes of each compartment to vary.

* * * * *